J. Guild,
Mortising Machine.
No. 333. Reissued Dec. 11, 1855.
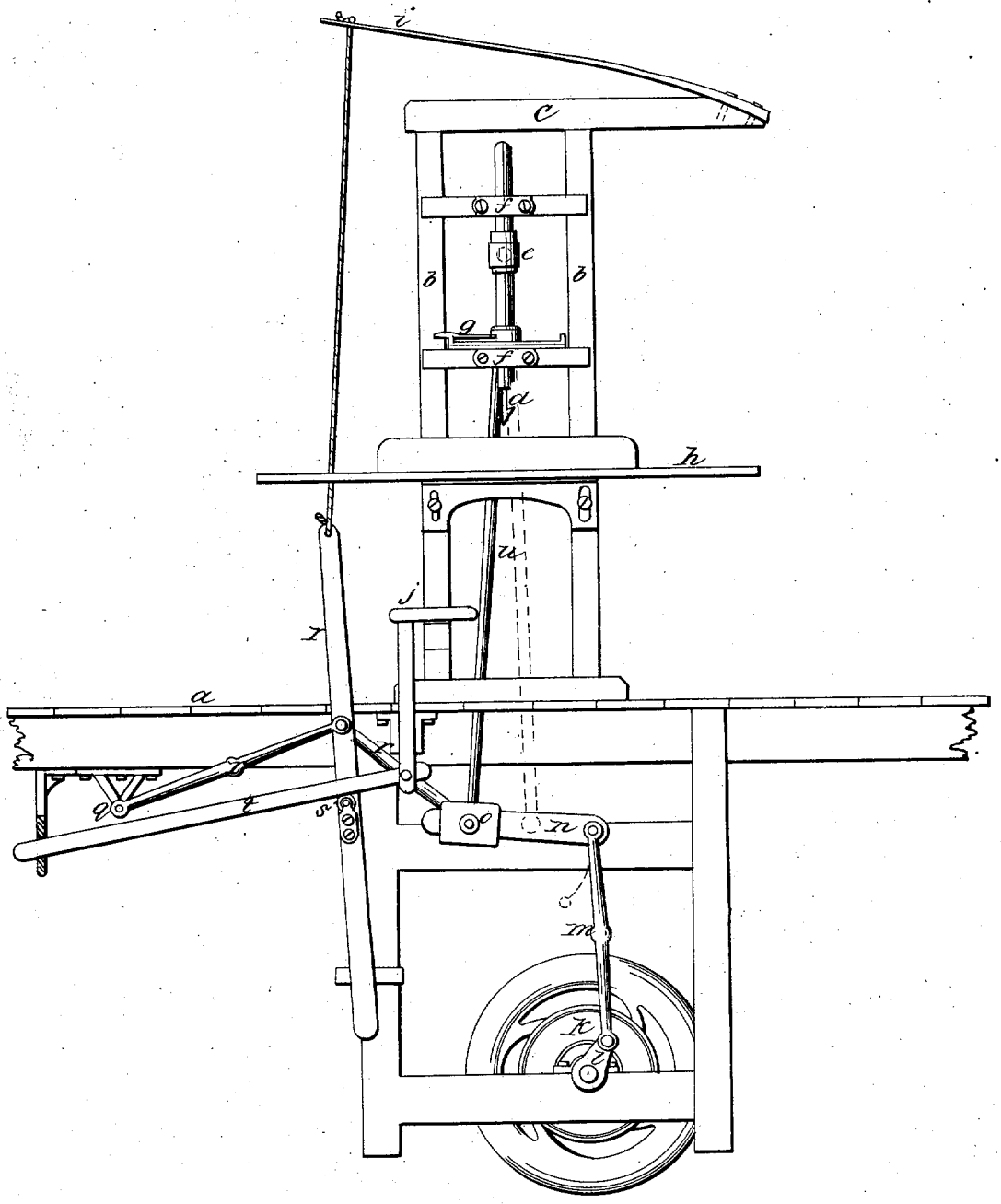
AM. PHOTO-LITHO. CO. N.Y. (OSBORNE'S PROCESS)

UNITED STATES PATENT OFFICE.

JOSEPH GUILD, OF CINCINNATI, OHIO.

IMPROVEMENT IN MORTISING-MACHINES.

Specification forming part of Letters Patent No. 9,431, dated November 30, 1852; Reissue No. 333, dated December 11, 1855.

*To all whom it may concern:*

Be it known that I, JOSEPH GUILD, of Cincinnati, Hamilton county, Ohio, have invented new and useful Improvements in Mortising-Machines; and I do hereby declare the following to be a full, clear, and exact description of the nature, construction, and operation of the same, reference being had to the annexed drawing, making part of this specification.

My improvements consist in an arrangement of mechanism in a mortising-machine whereby the chisel may be brought into instant action, its depth of cut be exactly and constantly controlled by the operator, or suspended without interfering with the driving-power.

In the annexed drawing a machine embodying my improvements is represented in front elevation.

*a* may be considered to represent the floor of a room or factory containing the machine. The stanchions *b*, cap-rail *c*, chisel *d*, chisel-mandrel *e*, mandrel-bearings *f*, reversing-handle *g*, and bench *h* are of the construction usual both in power and foot mortising-machines. The spring *i* and treadle *j* are also similar to those employed in foot mortising-machines, but are not attached directly to the mandrel, as they are in foot mortising-machines, in which the office of the spring is simply to abstract the chisel from the mortise preparatory to another stroke of the chisel by means of the treadle, the forces of the spring and treadle being thus opposite and alternating in their action. In my machine they are also opposite and alternating, but their duties are essentially different, the duty of the treadle being confined to the initiation and graduation of the cutting action, all the force of said cutting action being derived from the motive power and the duty of the spring being to reduce the range of the cutter, or even to cause a cessation of its motion, according as the pressure is lessened or altogether withdrawn from the treadle. By this means the prompt action and accurate graduation of the foot-machine are combined with the labor-saving character of the power-machine.

The motion originates in this machine with the pulley *k*, which may be of the fast and loose kind; but such arrangement is not employed in my machine to suspend or resume the action of the chisel between the cutting of two separate mortises. A crank, *l*, on the shaft of the pulley *k* connects by pitman *m* with a vibrating arm, *n*, attached to a rock-shaft. Fitted to this arm is a block, *o*, which I term the "sliding wrist," and which traverses along the arm. To this block is pivoted the free extremity of a toggle, *p*, having a fixed center at *g*. To the knuckle of this toggle is pivoted a vertical rod, *r*, capable of longitudinal motion. This rod carries a roller, *s*, upon which bears the lever *t* of the treadle *j*. The top of the rod *r* is connected to the spring *i*, whose retracting-power holds the rod and the knuckle to the highest points of their range when the pressure on the treadle is withdrawn. The sliding block *o*, before spoken of, connects by pitman *u* with the chisel-mandrel *e*, and is so arranged that when the toggle is bent to its full range of retraction the wrist of the block is exactly concentric with the center of motion of the vibrating arm *n*, and in this position, having no vertical play whatever, none is communicated to the chisel-mandrel. If now the treadle be slightly depressed, the toggle will push the block *o* somewhat along the arm *n*, and instantly the motion or range of the arm at that point to which the block is pushed will be communicated to the mandrel. With a further descent of the treadle the block will traverse a longer arc and an increased plunge of the chisel will result. Let now the pressure be removed from the treadle, and the apparatus, being abandoned to the action of the spring, will instantly revert to its normal position, and the wrist of the block at the same time becoming concentric with the center of vibration of the arm, the motion of the chisel will suddenly cease, although the arm continues to vibrate.

Should a mortise or a number of mortises be required, not to exceed a given depth, blocks or pins may be so placed as to limit the descent of the treadle.

The easy manipulation, prompt action, and nice graduation of cut obtained by means of my improvements in the construction of this staple machine are of material value for the following reasons:

In the commencement of a mortise, for the first few cuts the chisel can penetrate only a part of the depth without binding in the substance of the wood or being subject to the strain accompanied by jarring of the machinery, and sometimes tearing or injuring the surface of the stuff or breaking the tool; but in my machine the first few cuts may be made gently and at the mid-length of the mortise, and as the tool retreats toward either end (by the wood being passed under it) it may plunge deeper and deeper, until, after a few cuts, it just passes the half-thickness of the stuff and continues that depth till one end of the length of the mortise is reached. The tool being then reversed the action is repeated at full stroke in the other direction, and this process being repeated on the other side of the piece the mortise will be cleanly and easily effected. This is for mortises which pass clear through the stuff. This graduated commencement is a result hitherto unattained in power mortising-machines, so far as I am aware.

At the commencement or initiation of the cut a rapidly-increasing graduation is desired, while, on the other hand, when the chisel approaches its full stroke, greater power is required to be exerted by means of the treadle in order to maintain the sliding wrist at its outer position on the vibrating arm.

The toggle movement here applied is considered by me the best mode of converting the uniform downward pressure of the treadle to the desired graduated outward pressure against the sliding wrist. When the toggle is considerably bent, as it is in rest, of course a slight depression or elevation of the treadle will quickly either bring the chisel into operation or restore it to rest; and when the chisel is in full and forcible action in the wood the two limbs of the toggle being brought nearly in a line act with the greatest advantage and exercise a perfect control in holding out the wrist, features which have proved of the greatest value in the operation of the machine.

When not in use and in the short intervals between each mortise or section of a mortise, (as above described,) the chisel in my machines of itself becomes quiescent and only commences work as the foot is applied to the treadle, and that to any desired extent. The fast and loose pulleys and like devices hitherto in use in power mortising-machines are not susceptible of either the instantaneous action or the automatic cessation which characterizes my arrangement.

In a sash, blind, and door factory, such as worked by me, where many thousand pieces have to be mortised in a single week, this facility is of very essential value, as the work in that case consists of a large number of small mortises, the intervals between the formation of which require perfect inaction of the chisel.

Though I have represented the machine as one in which the driving-gear is beneath the floor of the factory, yet the machine may be made in a portable form, and, as it is merely a question of form and proportion, I shall not enter into the details of its adaptation to different localities. A common form of it will be a portable machine driven by unskilled manual labor, and with a fly-wheel like a lathe, the workman who attends to the mortising being fully occupied in that department, which is carried on with far greater rapidity than in machines of the common construction.

Having thus fully, clearly, and exactly described the nature, construction, and operation of my improvement in mortising-machines, what I claim as new, and desire to secure by Letters Patent, is—

1. The sliding wrist *o*, connected with the chisel and also with the driving-power in the manner described, in combination with the mechanism described, or its equivalent, for sliding said wrist, so that the operator can during the motion of the machine vary the depth of cut of the chisel, or cause it to be suspended without disconnecting the driving-power.

2. The combination, in a mortising-machine, substantially as described, of treadle and opposing spring or weight connected to a toggle, one end of which, being pivoted to the frame, the other is pivoted to a sliding wrist upon a vibrating arm actuated by the power, the said wrist being slid out and in upon the arm with varying power and speed by the action of said toggle and its attached weight or spring and treadle, as explained, or their equivalents.

In testimony whereof I hereunto set my hand before two subscribing witnesses.

JOSEPH GUILD.

Attest:
JAMES J. LYON,
J. H. GETZENDAMER.